(12) United States Patent
Hamano et al.

(10) Patent No.: US 6,422,126 B1
(45) Date of Patent: Jul. 23, 2002

(54) POWER STEERING APPARATUS

(75) Inventors: Satoshi Hamano; Akihiko Serizawa; Hiroyuki Fujita; Satoshi Aiko, all of Tochigi (JP)

(73) Assignee: Showa Corporation (JP)

( * ) Notice: Subject to any disclaimer, the term of this patent is extended or adjusted under 35 U.S.C. 154(b) by 0 days.

(21) Appl. No.: 09/671,406

(22) Filed: Sep. 27, 2000

(30) Foreign Application Priority Data

Dec. 1, 1999 (JP) .......................................... 11-342326

(51) Int. Cl.$^7$ .................................................. F01B 1/00
(52) U.S. Cl. ............................................. 91/447; 91/468
(58) Field of Search ........................ 91/447, 446, 445, 91/468; 137/493.8, 493.9

(56) References Cited

U.S. PATENT DOCUMENTS 5,584,226 A * 12/1996 Roemer et al. ............... 91/447
5,603,391 A  2/1997 Class et al.

FOREIGN PATENT DOCUMENTS

JP  6435180  3/1989  ............ B62D/5/07

* cited by examiner

Primary Examiner—Edward K. Look
Assistant Examiner—Michael Leslie

(57) ABSTRACT

In a power steering apparatus provided with a damper valve, a second valve apparatus of the damper valve is provided with a valve plate in contact with and apart from a partition member so as to open and close a through flow passage provided in the partition member, and a fluid storing recess portion is provided in a contact area between the partition member and the valve plate.

14 Claims, 7 Drawing Sheets

POWER STEERING APPARATUS

BACKGROUND OF THE INVENTION

1. Field of the Invention

The present invention relates to a power steering apparatus.

2. Description of the Related Art

Conventionally, as a power steering apparatus, there is a structure made to have a control valve for switching and connecting a pump side supply flow passage. It also has a tank side return flow passage to a first chamber and a second chamber of a power cylinder in accordance with a steering operation and interpose a damper valve between each of the first chamber and the second chamber of the power cylinder and the control valve. Further, the damper valve is structured, as described in Japanese Utility Model Application Laid-Open Publication No. 64-35180, to have a housing, a partition member for partitioning an inner portion of the housing into a power cylinder side and a control valve side, a first valve apparatus provided in the partition member and allows only a supply direction flow from the control valve side to the power cylinder side. A second valve apparatus provided in the partition member and applying a damping force to a return direction flow from the power cylinder side to the control valve side.

In this power steering apparatus, when steering to the right or the left, a fluid pressurized and fed by a pump is fed from the control valve to any one oil chamber of the first chamber and the second chamber in the power cylinder, and a propelling force is applied to a rack shaft passing through the power cylinder, thereby assisting the right or left steering force. At the same time, the fluid in another oil chamber in the power cylinder is returned to a tank via the control valve. Accordingly, when the steering force is neutral, the fluid pressurized and fed by the pump is returned to the tank from the control valve, whereby the fluid is not supplied and discharged to the first chamber and the second chamber of the power cylinder.

Further, in the power steering apparatus, the respective damper valves are connected to the first chamber and the second chamber of the power cylinder. Therefore neutral stability of the power cylinder at a neutral time of the steering operation is improved and a high-speed straight drive performance of the vehicle is improved. That is, at the neutral steering time, since the fluid is not supplied from the control valve side to the power cylinder side, the first valve apparatuses of the respective damper cylinders are in a closed state. The dosed state of the second valve apparatus is maintained as far as a road reaction force applied to the power cylinder is not over the damping force of the second valve apparatuses in the respective damper valves, whereby the fluid discharge from the first chamber or the second chamber of the power cylinder is not generated, and the power cylinder maintains an immobility, that is, the neutral stability is improved.

Thus, in accordance with the power steering apparatus provided with the damper valve, at a neutral steering time, with both damper valves respectively connected to the first chamber and the second chamber of the power cylinder, a valve plate constituting the second valve apparatus is attached (closely adhered) to the partition member, so as to close a through flow passage provided in the partition member. Accordingly, when supplying the fluid to the first chamber of the power cylinder, for example when turning to the left so as to discharge the fluid in the second chamber when steering input of a driver for starting the steering operation from the neutral state, the first valve apparatus of the damper valve connected to the first chamber is opened and the second valve apparatus of the damper valve connected to the second chamber is opened. However, the valve plate of the second valve apparatus applies a certain load (an attachment feeling) for removing the attachment between the valve plate and the partition member to the driver.

Further, for example, when turning to the left in which the fluid is supplied to the first chamber of the power cylinder, the valve plate constituting the second valve apparatus in the damper valve connected to the first chamber is attached (closely adhered) to the partition member so as to close the through flow passage provided in the partition member. Accordingly, when steering input of the driver for turning to the right from the leftward steering state, in order to discharge the fluid in the first chamber mentioned above, the now closed second valve apparatus of the damper valve connected to the first chamber is opened. At this time, the valve plate of the second valve apparatus applies a certain load (an attachment feeling) to remove the attachment between the valve plate and the partition member to the driver.

SUMMARY OF THE INVENTION

An object of the present invention is to remove a steering load felt by a driver when starting a steering operation from a neutral state and turning to the left or the right in a power steering apparatus provided with a damper valve.

According to the present invention, there is disclosed a power steering apparatus which has a control valve for switching and connecting a pump side supply flow passage and a tank side return flow passage to a first chamber. It also has a second chamber of a power cylinder in accordance with steering operation and interposing a damper valve between each of the first chamber and the second chamber of the power cylinder and the control valve, wherein a damper valve has a housing, a partition member for partitioning an inner portion of the housing into a power cylinder side and a control valve side, a first valve apparatus provided in the partition member and allowing only a supply direction flow from the control valve side to the power cylinder side, and a second valve apparatus provided in the partition member. Applying a damping force to a return direction flow from the power cylinder side to the control valve side, and wherein the damper valve has a cap attached to the housing and holds the partition member between the cap and the housing.

BRIEF DESCRIPTION OF THE DRAWINGS

The present invention will be more fully understood from the detailed description given below and from the accompanying drawings which should not be taken to be a limitation on the invention, but are for explanation and understanding only.

The drawings

FIGS. 5A and 5B show a partition member of a damper valve, in which FIG. 5A is an end surface view and FIG. 5B is a cross sectional view along a line B—B in FIG. 5A;

FIGS. 7A and 7B show an axial member, in which FIG. 7A is a side elevational view and FIG. 7B is a cross sectional view;

DESCRIPTION OF THE PREFERRED EMBODIMENTS

Figure 1:
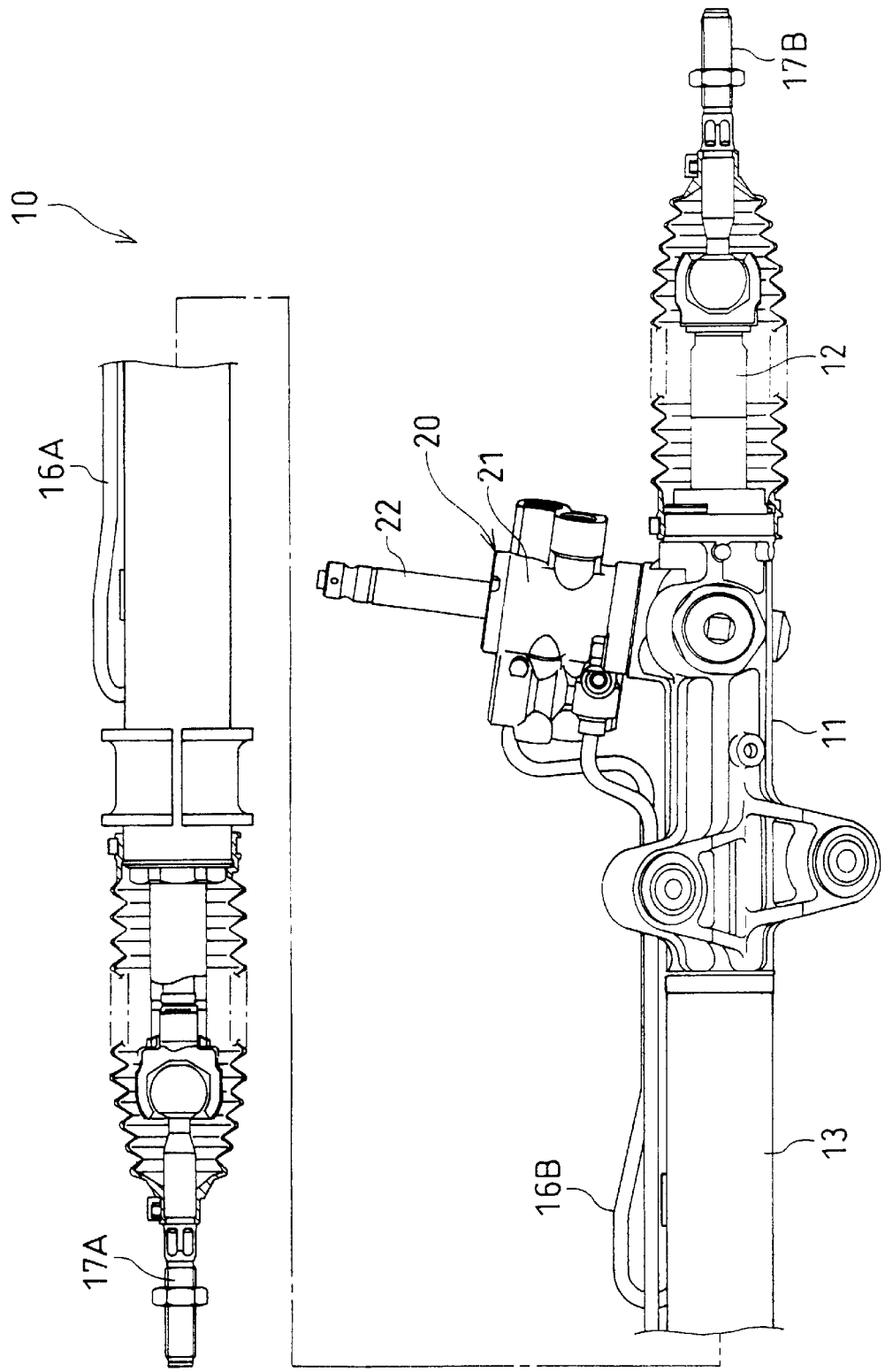
FIG. 1 is a front elevational view showing a hydraulic power steering apparatus.
Figure 2:
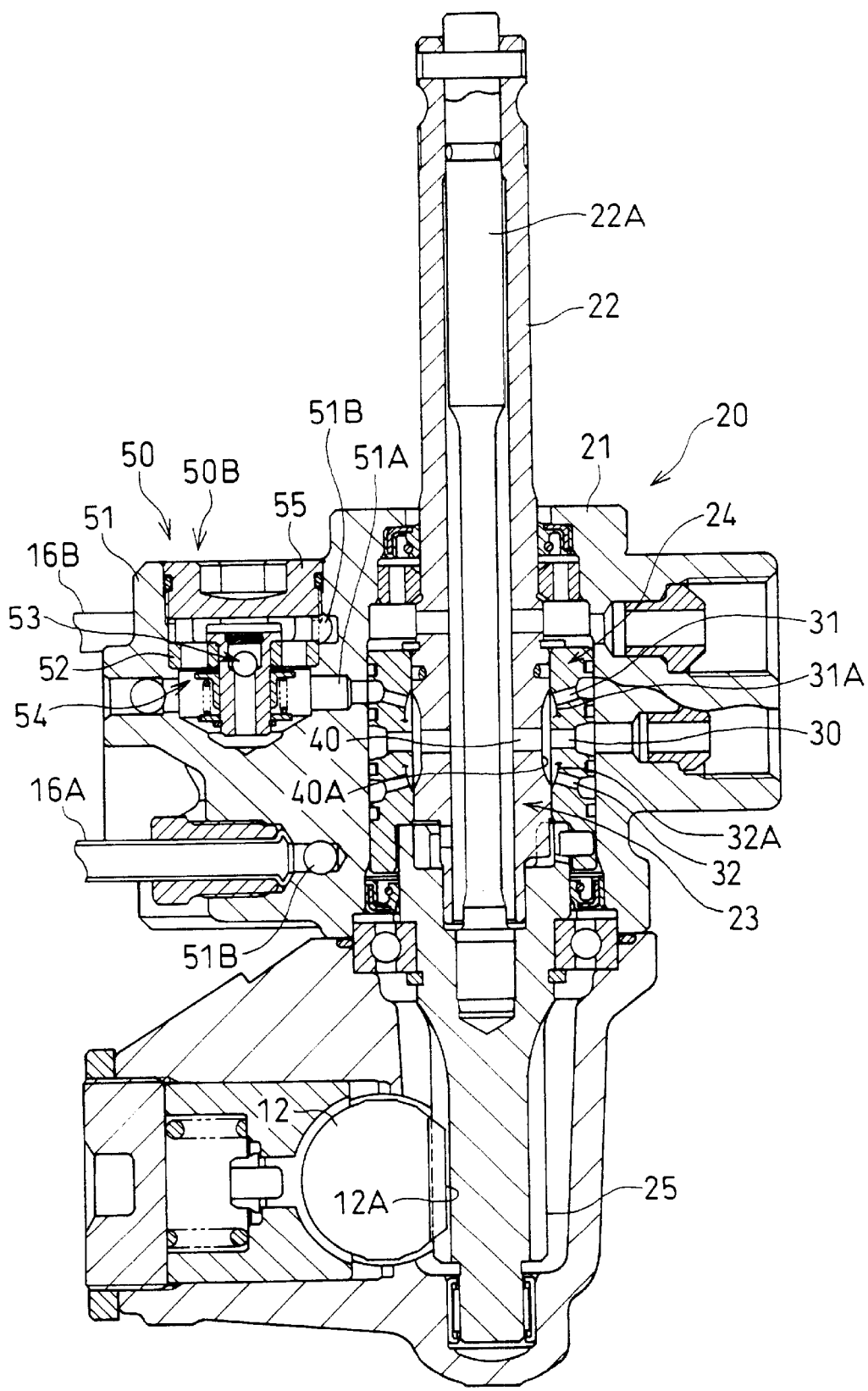
FIG. 2 is a cross sectional view of a main portion in FIG. 1.
Figure 3:
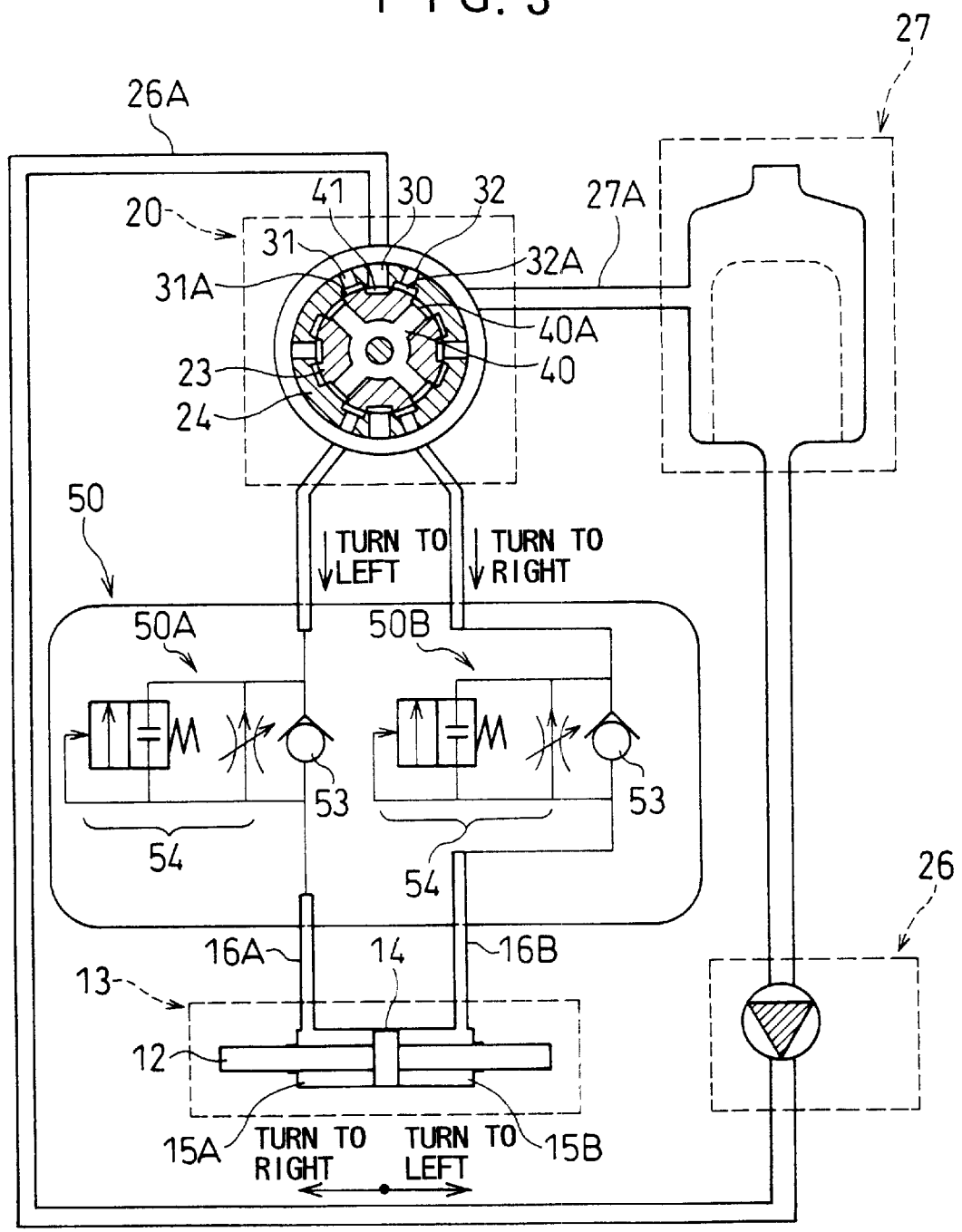
FIG. 3 is a circuit diagram showing a hydraulic circuit.

A hydraulic power steering apparatus 10 is structured, as shown in FIGS. 1 to 3, such that a rack shaft 12 is supported by a steering body 11 fixed to a vehicle body frame or the like by a bracket (not shown) in such a manner as to freely move straight, a power cylinder 13 is provided, a piston 14 is provided in the rack shaft 12 passing through the power cylinder 13, and a first chamber 15A and a second chamber 15B partitioned by the piston 14 are formed in an inner portion of the power cylinder 13. Further, in the hydraulic power steering apparatus 10, left and right tie rods 17A and 17B are connected to the rack shaft 12 in order to assist a steering force of the steering wheel by a driver.

The hydraulic power steering apparatus 10 is structured such that a valve body 21 of a control valve 20 is fixed to the steering body 11. The control valve 20 is structures such that an input shaft 22 rotating interlocking with the steering wheel is pivotally supported to the valve body 21. A circular rotor 23 fixed to the input shaft 22 and a circular sleeve 24 fixed to a front end portion of a torsion bar 22A fixed to the input shaft 22 together with a pinion 25 are coaxially arranged in such a manner as to be freely displaced with each other in accordance with an elastic twist deformation of the torsion bar 22A in response to a steering torque applied to the steering wheel. A pump side supply flow passage 26A and a tank side return flow passage 27A are switched and connected to first and second supply and discharge flow passages 16A and 16B respectively connected to the first chamber 15A and the second chamber 15B of the power cylinder 13 in accordance with the steering operation. In FIG. 3, reference numeral 26 denotes a pump, and reference numeral 27 denotes a tank. In this case, a pinion 25 fixed to the sleeve 24 is engaged with rack teeth 12A of the rack shaft 12.

A particular structure of the sleeve 24 and the rotor 23 of the control valve 20 is as follows (FIGS. 2 and 3).

That is, a supply port 30 connected to the pump side supply flow passage 26A, a first port 31 and a second port 32 constitute a set of ports. The first port 31 and the second port 32 are arranged in both sides of the supply port 30 and respectively connected to the first chamber 15A and the second chamber 15B of the power cylinder 13. Plural sets of these port groups are arranged around a center axis (the torsion bar 22A) in the sleeve 24 in a point symmetrical manner. In this case, the first port 31 is connected to the first chamber 15A (via a first damper valve 50A mentioned below) by the first supply and discharge flow passage 16A. The second port 32 is connected to the second chamber 15B (via a second damper valve 50B mentioned below) by the second supply and discharge flow passage 16B.

A plurality of return ports 40 communicated with the tank side return flow passage 27A are arranged around a center axis (the torsion bar 22A) in the rotor 23 in a point symmetrical manner.

Accordingly, in the control valve 20, vertical grooves 31A and 32A are provided at a position including the first port 31 and the second port 32 on an inner surface of the sleeve 24. A vertical groove 41 is provided at a position opposing to the supply port 30 of the sleeve 24 on an outer surface of the rotor 23, and a vertical groove 40A is provided at a position including the return port 40 on the outer surface of the rotor 23, so that adjacent ports (the supply port 30, the first port 31, the second port 32 and the return port 40) can be communicated with each other by the vertical grooves 31A, 32A, 41 and 40A.

Accordingly, the control valve 20 is operated in the manner mentioned below.

(1) At neutral steering, the vertical groove 41 of the rotor 23 is just opposed to the supply port 30 of the sleeve 24. Accordingly, the fluid supplied to the supply port 30 is returned to the tank 27 from the return port 40 via the vertical groove 41 and the vertical grooves 31A, 32A and 40A, and the power cylinder 13 is not operated.

(2) For example, when rotating the rotor 23 to the left from the state shown in FIG. 3 for steering to the left when turning, an overlapping portion between the vertical groove 41. Also the vertical groove 31A constituting the flow passage from the supply port 30 to the first port 31 is expanded, and an overlapping portion between the vertical grooves 41 and 32A constituting the flow passage from the supply port 30 to the second port 32 is narrowed, whereby the fluid supplied to the supply port 30 is supplied to the first chamber 15A of the power cylinder 13 from the vertical groove 41 via the vertical groove 31A and the first port 31. The fluid in the second chamber 15B is returned to the tank 27 from the return port 40 via the second port 32 and the vertical grooves 32A and 40A. Accordingly, the power cylinder 13 is operated so as to assist a steering force for turning to the left.

The hydraulic power steering apparatus 10 is, as shown in FIG. 2, which provides a damper valve 50 assembled in the valve body 21 of the control valve 20, is provided with a first damper valve 50A between the first port 31 of the control valve 20 and the first chamber 15A of the power cylinder 13, and is provided with a second damper valve 50B between the second port 32 of the control valve 20 and the second chamber 15B of the power cylinder 13. The first damper valve 50A is connected to the first chamber 15A by the first supply and discharge flow passage 16A mentioned above and the second damper valve 50B is connected to the second chamber 15B by the second supply and discharge passage 16B mentioned above. Since the first damper valve 50A and the second damper valve 50B have the same structure and the same operation, hereinafter, both are referred to as the damper valve 50, and a particular structure thereof will be described.

Figure 4:
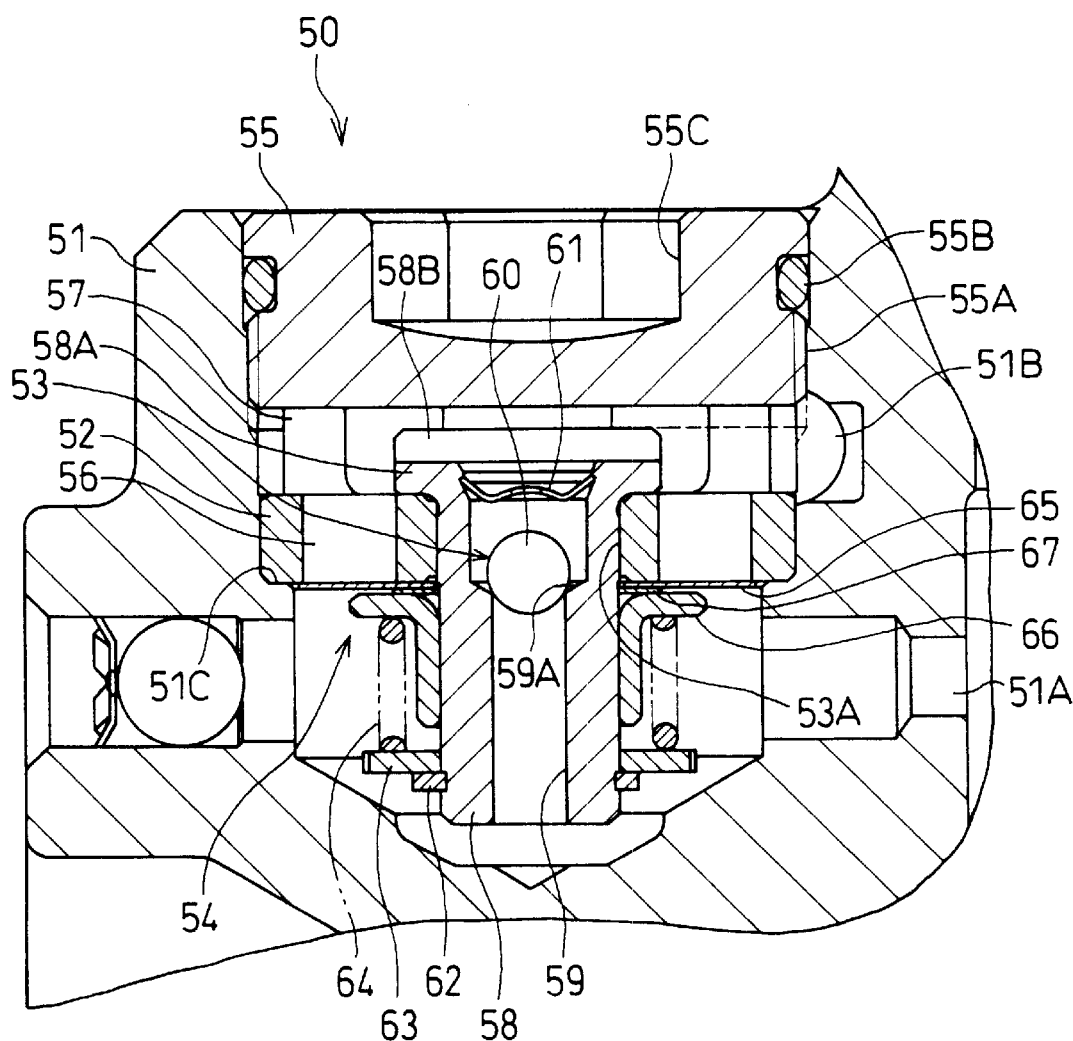
FIG. 4 is a cross sectional view showing a damper valve.

The damper valve 50 has a housing 51 corresponding to a part of the valve body 21 of the control valve 20, a partition member 52 for partitioning an inner portion of the housing 51 into a side of the power cylinder 13 and a side of the control valve 20. It has a first valve apparatus 53 which is provided in the partition member 52 and allows only a supply direction flow from the side of the control valve 20 (a control valve port 51A) to the side of the power cylinder 13 (a power cylinder port 51B). It also allows a flow to a second valve apparatus 54 provided in the partition member 52 and applying a damping force to a return direction flow from the side of the power cylinder 13 to the side of the control valve 20, as shown in FIG. 4. Further, the damper valve 50 has a cap 55 attached to the housing 51 and holds the partition member 52 between the cap 55 and the housing 51.

Figure 8:
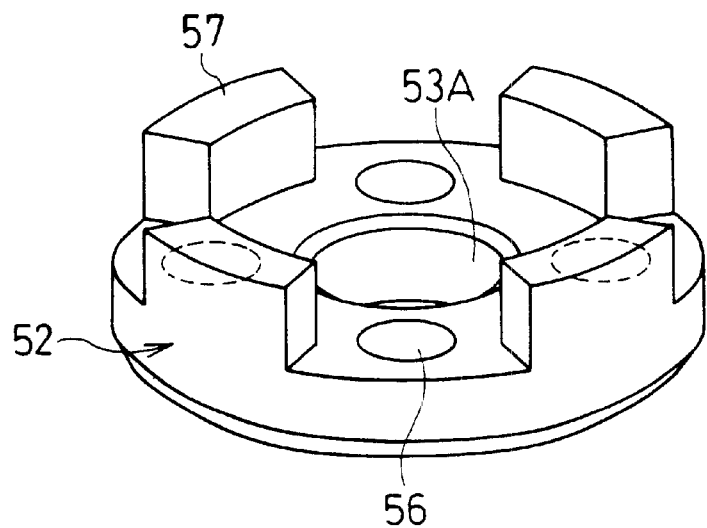
FIG. 8 is a perspective view showing a partition member.

The partition member 52 is provided with an attaching hole 53A for the first valve apparatus 53 in a center portion of a disc plate. It is provided with a through flow passage 56 at a plurality of positions in a peripheral direction of the disc plate and enables an upright position of a protruding portion 57 pressed by the cap 55 from an outer peripheral surface of one end surface of the disc plate so as to be provided between flow passages 56 thereof, as shown in FIG. 8. The partition member 52 is structured such that the protruding portion 57 upright in a portion close to the outer periphery of one end surface of the disc plate is pressed by the cap 55 [in a state of] mounting a portion close to an outer periphery of another end surface of the disc plate on a stepped portion provided in the housing 51, whereby the portion close to the outer periphery is held between the cap 55 and the housing 51.

The first valve apparatus 53 is provided with a hollow shaft member 58 which is attached to the attaching hole 53A in the partition member 52. It is structured such that a ball valve 60 is seated on an intermediate valve seat 59A of a hollow flow passage 59 in the shaft member 58. Also a one-way clip 61 is engaged with an opening portion of the flow passage 59 so as to hold the ball valve 60. At this time, the shaft member 58 is integrally assembled in the partition member 52. Accordingly in the state that one end flange portion 58A is engaged with one end surface of the partition member 52, by a stopper ring 62 which is engaged with another end portion, a spring receiver 63, a spring 64 and the like. In this case, the shaft member 58 is provided with a flow passage 58B crossing the flow passage 59 in the flange portion 58A. Accordingly, the first valve apparatus 53 allows only a supply direction flow from the side of the control valve 20 (the control valve port 51A) to the side of the power cylinder 13 (the power cylinder port 51B) due to a checking function of the ball valve 60, as mentioned above.

The second valve apparatus 54 has a valve plate 65 which is in contact with and apart from the valve seat 52A on the end surface of the partition member 52 so as to open and close the flow passage 56 provided in the partition member 52, and brings the valve plate 65 into pressure contact with the valve seat 52A on the end surface of the partition member 52 via a spring guide 66 and a valve stopper 67 by the stopper ring 62 provided in the shaft member 58 and a spring 64 backed-up by the spring receiver 63. Accordingly, the second valve apparatus 54 is, as schematically shown in FIG. 3, provided with a variable throttle valve function due to an elastic bending deformation of the valve plate 65 itself and a pilot valve function of the valve plate 65 backed-up by the spring 64. Therefore, it applies a damping force to the return direction flow from the side of the power cylinder 13 (the power cylinder port) to the side of the control valve 20 (the control valve port 51A).

The cap 55 has a male screw portion 55A on an outer periphery in a front end side and an O-ring 55B on an outer periphery in a base end side, and is engaged with the housing 51. Reference numeral 55C denotes a hexagonal hole portion for a tool.

Figure 6:
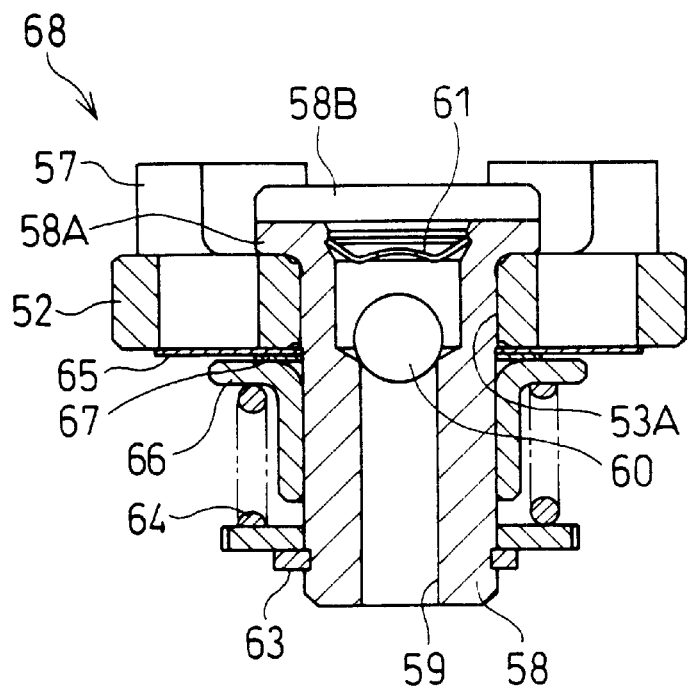
FIG. 6 is a cross sectional view showing a valve assembly.
Figure 7A:
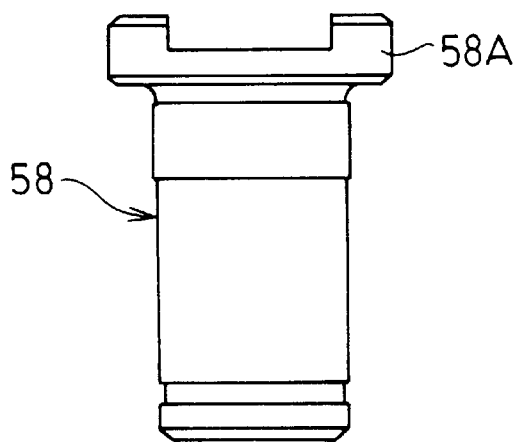
Figure 7B:
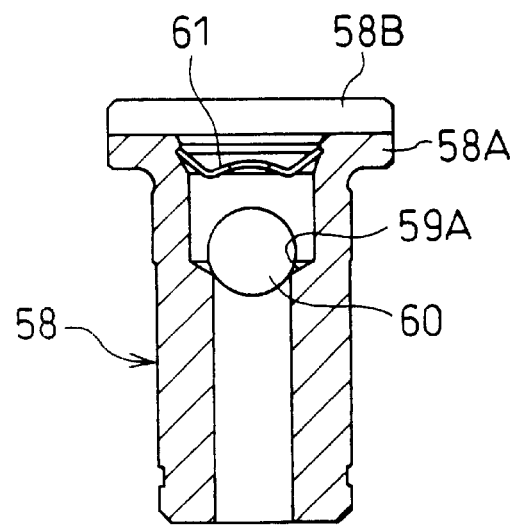

The damper valve 50 can assemble a structure obtained by sub-assembling the first valve apparatus 53 as shown in FIGS. 7A and 7B into the attaching hole 53A of the partition member 52. It constitutes a valve assembly 68 obtained by assembling the second valve apparatus 54 as shown in FIG. 6, assembles the valve assembly 68 in the housing 51, and can be fixed by the cap 55 as mentioned above.

Accordingly, the damper valve 50 (50A and 50B) is operated in the manner mentioned below.
 (1) At neutral steering, since the fluid is not supplied from the side of the control valve 20 to the side of the power cylinder 13, the first valve apparatus 53 of the damper valve 50 (both 50A and 50B) is in a closed state. Then, as far as the road reaction force acting on the power cylinder 13 is not over a set damping force of the second valve apparatus 54 of the damper valve 50, the second valve apparatus 54 also maintain a closed state and does not generate a fluid discharge from the first chamber 15A or the second chamber 15B of the power cylinder 13, and the power cylinder 13 maintains immobility, that is, improves a neutral stability (a high speed linearity or the like).
 (2) When turning left, the fluid is supplied from the side of the control valve 20 to the first chamber 15A of the power cylinder 13, and the fluid in the second chamber 15B is discharged. At this time, the first valve apparatus 53 of the first damper valve 50A which is connected to the first chamber 15A is opened. The second valve apparatus 54 of the second damper valve 50B which is connected to the second chamber 15B is opened, thereby making it possible to operate the power cylinder 13.

Figure 9:
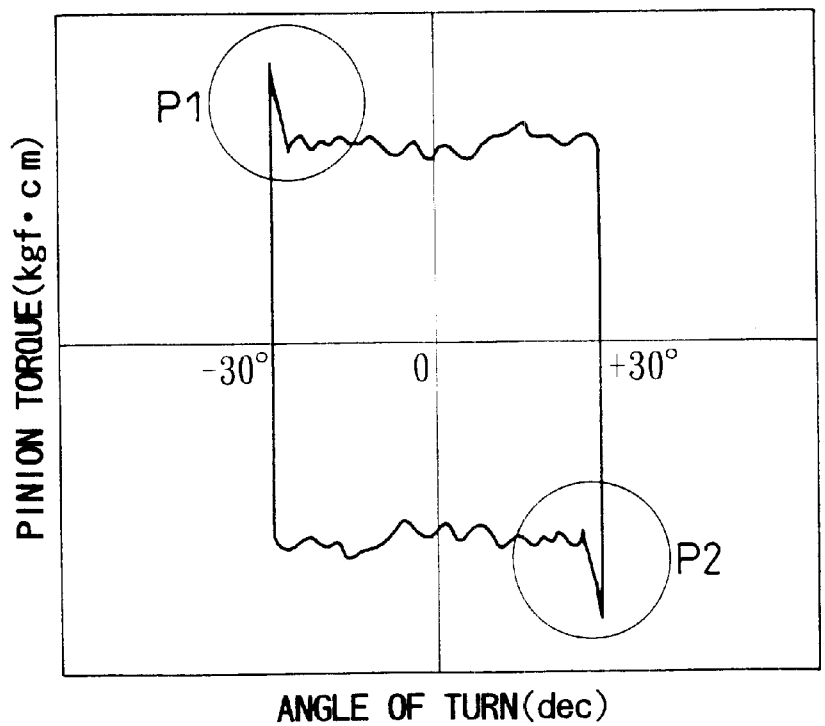
FIG. 9 is a graph showing a steering torque.

Accordingly, in the damper valve 50 (50A and 50B), when steering operation is started from the neutral state or turning left or the right, for example, when turning left, the second valve apparatus 54 of the second damper valve 50B connected to the second chamber 15B corresponding to the discharge side is opened as mentioned in the item (2). However, since the valve plate 65 of the second valve apparatus 54 cancels the attachment between itself and the valve seat 52A of the partition member 52, there is a possibility of giving a feeling of a certain load (an attachment feeling) (P1 and P2 in FIG. 9) to a driver.

Figure 5A:
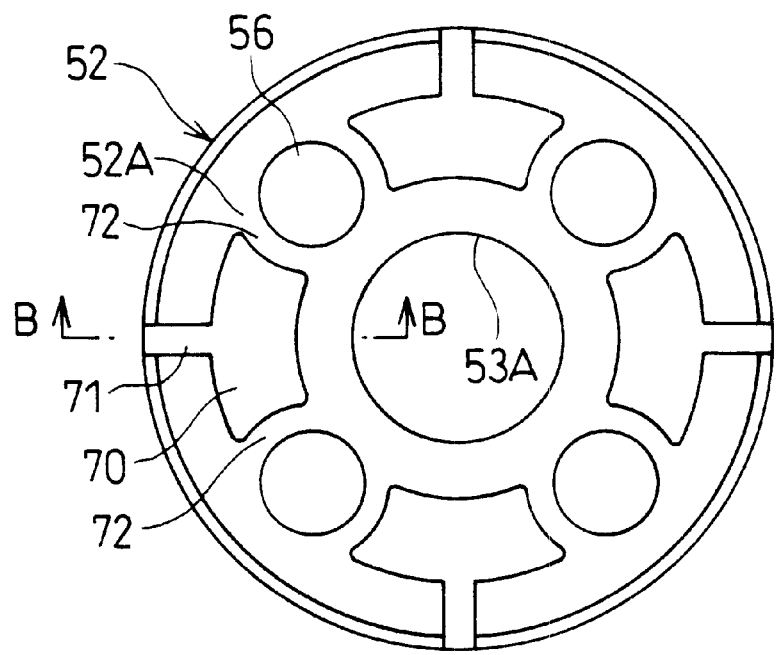
Figure 5B:
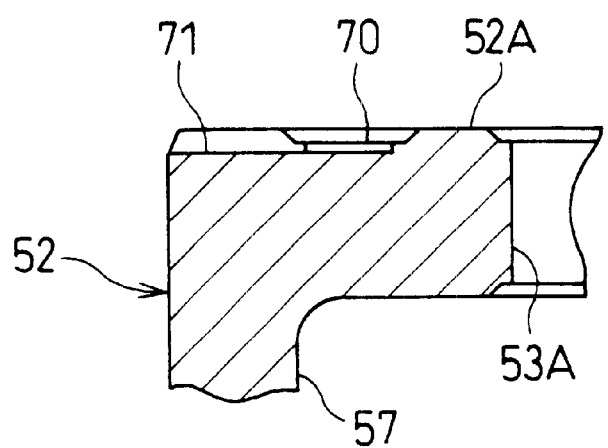

Then, in accordance with the present embodiment, in order to remove the attachment feeling mentioned above, as shown in FIG. 5, a fluid storing recess portion 70 is provided in a contact area between the partition member 52 and the valve plate 65. The fluid storing recess portion 70 may be formed in any of the partition member 52 and the valve plate 65. However, in the present embodiment, a convex portion 72 is provided between the flow passages 56 and 56 mentioned above in the valve seat 52A of the partition member 52 and the fluid storing recess portion 70 is formed in the periphery of the convex portion 72. The fluid storing recess portion 70 is received between an inner diameter and an outer diameter of the valve plate 65 assembled in the partition member 52. However, an oil groove 71 for introducing the fluid to the recess portion 70 is extended to an outer portion of the outer diameter of the valve plate 65 and an outer peripheral side of the partition member 52.

In accordance with the present embodiment, the following effects can be obtained.
 (1) Since the fluid storing recess portion 70 is formed at the contact area between the partition member 52 and the valve plate 65 in the damper valve 50, it is possible to prevent the attachment of the valve plate 65 to the partition member 52. Accordingly, it is possible to remove the steering load felt by the driver at a time of starting the steering operation from the neutral state and turning to the left or the right.
 (2) The fluid storing recess portion 70 can be formed in the partition member.
 (3) The fluid storing recess portion 70 may be formed in the valve plate 65.

As heretofore explained, embodiments of the present invention have been described in detail with reference to the drawings. However, the specific configurations of the present invention are not limited to the embodiments but those having a modification of the design within the range of the present invention are also included in the present invention.

As mentioned above, in accordance with the present invention, in the power steering apparatus provided with the damper valve, it is possible to remove the steering load felt by the driver when starting the steering operation from the neutral state and turning to the left or the right.

Although the invention has been illustrated and described with respect to several exemplary embodiments thereof, it should be understood by those skilled in the art that the foregoing and various other changes, omissions and additions may be made to the present invention without departing from the spirit and scope thereof. Therefore, the present invention should not be understood as limited to the specific embodiment set out above, but should be understood to include all possible embodiments which can be embodied within a scope encompassed and equivalents thereof with respect to the features set out in the appended claims.

What is claimed is:

1. A power steering apparatus, comprising a control valve for switching and connecting a pump side supply flow passage and a tank side return flow passage to a first chamber and a second chamber of a power cylinder in accordance with a steering operation and interposing a damper valve between each of the first chamber and the second chamber of the power cylinder and the control valve, a damper valve having a housing, a partition member for partitioning an inner portion of the housing into a power cylinder side and a control valve side, a first valve apparatus provided in the partition member and allowing only a supply direction flow from the control valve side to the power cylinder side, and a second valve apparatus provided in the partition member arranged and constructed to apply a damping force to a return direction flow from the power cylinder side to the control valve side, wherein the second valve apparatus of the damper valve has a valve plate which is in contact with and apart from said partition member so as to open and close a through flow passage provided in the partition member, and having a fluid storing recess portion in a contact area between the partition member and the valve plate.

2. A power steering apparatus as claimed in claim 1, wherein an oil groove arranged and constructed to introduce fluid to said recess portion is extended to an outer portion of an outer diameter of the valve plate and an outer peripheral side of the partition member, in said fluid storing recess portion.

3. A power steering apparatus as claimed in claim 1, wherein said fluid storing recess portion is disposed in the valve plate.

4. A power steering apparatus as claimed in claim 3, wherein an oil groove arranged and constructed to introduce fluid to said recess portion is extended to an outer portion of an outer diameter of the valve plate and an outer peripheral side of the partition member, in said fluid storing recess portion.

5. A power steering apparatus as claimed in claim 1, wherein said fluid storing recess portion is disposed in the partition member.

6. A power steering apparatus as claimed in claim 5, wherein an oil groove arranged and constructed to introduce fluid to said recess portion is extended to an outer portion of an outer diameter of the valve plate and an outer peripheral side of the partition member, in said fluid storing recess portion.

7. A power steering apparatus as claimed in claim 5, wherein said fluid storing recess portion is disposed in the valve plate.

8. A power steering apparatus as claimed in claim 7, wherein an oil groove arranged and constructed to introduce fluid to said recess portion is extended to an outer portion of an outer diameter of the valve plate and an outer peripheral side of the partition member, in said fluid storing recess portion.

9. A power steering apparatus as claimed in claim 2, wherein said partition member comprising a plurality of through flow passages and a convex portion between the flow passages, and said fluid storing recess portion being disposed in periphery of said convex portion.

10. A power steering apparatus as claimed in claim 9, wherein an oil groove arranged and constructed to introduce fluid to said recess portion is extended to an outer portion of an outer diameter of the valve plate and an outer peripheral side of the partition member, in said fluid storing recess portion.

11. A power steering apparatus as claimed in claim 9, wherein said fluid storing recess portion is disposed in the valve plate.

12. A power steering apparatus as claimed in claim 11, wherein an oil groove arranged and constructed to introduce fluid to said recess portion is extended to an outer portion of an outer diameter of the valve plate and an outer peripheral side of the partition member, in said fluid storing recess portion.

13. A power steering apparatus according to claim 1, wherein said damper valve comprises a valve assembly arranged and constructed such that said first valve apparatus and said second valve apparatus are assembled in said partition member.

14. A power steering apparatus according to claim 1, said partition member having an attaching hole for the first valve apparatus in a center portion of a disc plate, and a through flow passage at a plurality of positions in a peripheral direction of the disc plate which erects a protruding portion pressed by said cap from an outer peripheral surface of one end surface of the disc plate so as to be arranged between flow passages thereof, said first valve apparatus having a hollow shaft member attached to said attaching hole in the partition member and being such that a ball valve is seated on an intermediate valve seat of a hollow flow passage in said shaft member and a clip is engaged with an opening portion of the flow passage so as to hold the ball valve, and said shaft member is integrally disposed in the partition member, one end flange portion is engaged with one end surface of the partition member by a stopper ring engaged with another end portion, a spring receiver and a spring, wherein said second valve apparatus has said valve plate which is in contact with and apart from the valve seat on the end surface of said partition member so as to open and close said through flow passage disposed in the partition member, and brings the valve plate into pressure contact with the valve seat on the end surface of the partition member via a spring guide by the stopper ring disposed in said shaft member and said spring is backed-up by the spring receiver.

* * * * *